UNITED STATES PATENT OFFICE.

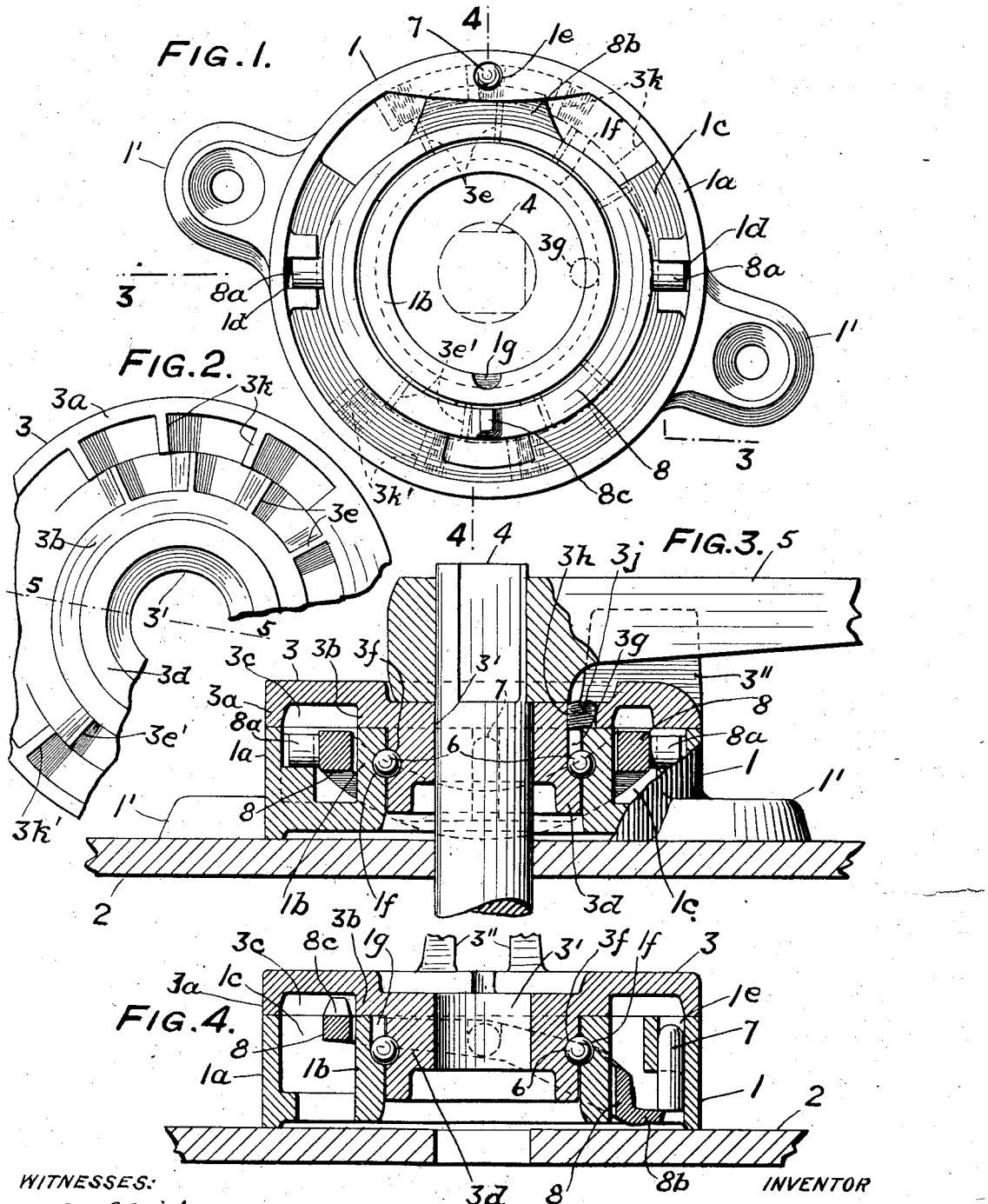

CYRUS P. EBERSOLE, OF PHILADELPHIA, PENNSYLVANIA, ASSIGNOR TO AMERICAN AUTOMOTONEER COMPANY, OF PHILADELPHIA, PENNSYLVANIA, A CORPORATION OF PENNSYLVANIA.

CONTROLLER-REGULATOR.

1,024,769.  Specification of Letters Patent.  Patented Apr. 30, 1912.

Application filed September 8, 1911.  Serial No. 648,312.

*To all whom it may concern:*

Be it known that I, CYRUS P. EBERSOLE, a citizen of the United States, residing in the city of Philadelphia, county of Philadelphia, and State of Pennsylvania, have invented certain Improvements in Controller-Regulators, of which the following is a specification.

My invention relates to means for regulating the operations of electric controllers for the purpose of preventing too rapid admission of current to motors while permitting the current to be cut out quickly.

Characteristic features of my improvements reside in the adaptability of the same parts for use in effecting the desired retardation in moving in either direction from the off position while permitting free reverse movement in both directions, the capacity to operate correctly under various conditions of use, the ability to stand up to the work, the reduction of the tendency to deterioration to the narrowest limits comprising a simple element that can readily be replaced, and the capacity to resist the efforts of operatives to tamper with the mechanism and prevent the desired action.

In the accompanying drawings, Figure 1 is a top plan view of the base of my improved mechanism with features of the hood shown in dotted line projection; Fig. 2 is a bottom plan view of a section of the hood; Fig. 3 is a sectional view taken on the line 3—3 of Fig. 1 representing the mechanism in its operative relation; and Fig. 4 is a sectional view taken on the line 4—4 of Fig. 1 with the hood in place and the mechanism in position on a controller casing.

The mechanism, as illustrated in the drawings, comprises the base 1 having thereon the lugs 1', by which it is fixed to the top 2 of the controller casing, in combination with the hood 3 having the central aperture 3' for passing the controller shaft 4 and the lugs 3'' for engagement with the handle 5 by which the hood and shaft are operated in unison.

The base 1 is provided with the concentric outer and inner rings $1^a$ and $1^b$ forming a channel $1^c$ in which are the diametrically disposed bearings $1^d$ and the median bearing $1^e$, the bearings as shown being connected with the outer ring $1^a$. The inner ring $1^b$ is provided with the ball race $1^f$ and the ball way $1^g$ intersecting it.

The hood is provided with the concentric outer and inner rings $3^a$ and $3^b$ which bear upon the respective rings $1^a$ and $1^b$, the channel $3^c$ concentric with the channel $1^c$, and the cylindrical hub $3^d$ which fits within the ring $1^b$. The hub has therein the ball race $3^f$ which registers with the race $1^f$, the ball way $3^g$ adapted to register with the way $1^g$, and the way $3^h$ normally closed by the screw plug $3^j$. Balls 6 are inserted through the way $3^h$ and the registering ways $1^g$ and $3^g$ into the races $1^f$ and $3^f$, whereby an antifriction bearing and lock are provided for the hood in its relation to the base.

The hood has in the channel $3^c$ two sets of oppositely disposed downwardly projecting ratchet teeth $3^k$ and $3^{k'}$ arranged in a circle so as to move in succession over the bearing $1^e$ and concentrically therewith the two sets of downwardly extending cams $3^e$ and $3^{e'}$ lying within the ratchet teeth and spaced relatively thereto, the interior construction of the hood being symmetrical with reference to the center line 5—5.

The base has in the bearing $1^e$ a plunger 7, suitably a case hardened steel bolt or pin, which is movable vertically into and out of engagement with the teeth $3^k$ and $3^{k'}$ as the hood is revolved. A ring 8, disposed in the channel $1^c$, is provided with the trunnions $8^a$ which are fulcrumed in the bearings $1^d$, with the toe or projection $8^b$ which extends under the bearing $1^e$ into engagement with the bottom of the plunger 7, and the boss $8^c$ diametrically placed relatively to the plunger.

In operation, when the handle 5 is turned in either direction from the "off" position, the hood 3 is revolved upon the base 1 in unison with the revolution of the shaft 4, and the cams $3^e$ or $3^{e'}$ act in succession upon the boss $8^c$, which is held in the path of such cams by the greater weight of the ring or ring shaped lever 8 on the opposite side of the trunnions $8^a$. When an advancing cam $3^e$ or $3^{e'}$ strikes and passes the boss $8^c$, the ring or lever 8 is rocked and the projection $8^b$ is elevated, elevating the plunger 7 into position for positively engaging the advancing ratchet tooth $3^k$ or $3^{k'}$, whereby the movement of the hood 3 and the controller shaft 4 is interrupted, the parts being designed so that interruption shall be effected in correspondence with engagement of the contact points of the controller (not shown). The forward movement having been checked, upon relaxing the pressure upon the handle the plunger drops, permitting the handle and hood to be moved forward until the succeeding cam rocks the ring and again elevates the plunger into the path of the succeeding ratchet tooth, and so on. When the handle and hood are turned back in either direction, from the "on" to the "off" position, the ratchet teeth ride over the plunger, which falls by gravity and otherwise is pressed down by the inclined surfaces of the ratchet teeth, while the boss moves between the corresponding cams, whereby an uninterrupted movement is permitted in cutting out the current.

The peculiar character of the mechanism permits the desired control to be effected in either a single or several directions of movement and further limits the locking duty to simple parts adapted for effecting the desired engagement with the minimum tendency to wear, the plunger, which is subject to the highest duty, being readily replaced.

Having described my invention, I claim:

1. In a controller regulator, a stationary member, a revoluble member, a plunger, a bearing fixed relatively to one of said members in which said plunger is adapted to reciprocate, stopping devices fixed relatively to the other of said members with which said plunger is adapted to engage, and means operated by said revoluble member for moving said plunger into engagement with said devices.

2. In a controller regulator, a base, a member fulcrumed therein, a revoluble hood provided with ratchet teeth, means whereby said hood tilts said member, and a reciprocating device operated by said member for engaging said ratchet teeth.

3. In a controller regulator, a base, a hood revoluble thereon, ratchet teeth and cams on one of said parts, a member fulcrumed on the other of said parts and adapted to be tilted by said cams, and a plunger operated by said member for engaging said ratchet teeth.

4. In a controller regulator, a base, a hood revoluble thereon, means fulcrumed on one of said parts, cams and ratchet teeth disposed in concentric circles on the other of said parts, said cams engaging and tilting said means, and a plunger moved by said means into the path of said ratchet teeth and withdrawn therefrom by gravity.

5. In a controller regulator, a stationary member, a revoluble member, and a lever fulcrumed on and a plunger guided by one of said members, said lever being tilted by and said plunger thereby caused to engage the other of said members.

6. In a controller regulator, a stationary member, a revoluble member, one of said members having a fulcrum and a bearing and the other of said members having cams and ratchet teeth, a lever carried by said fulcrum and tilted by said cams, and a plunger in said bearing movable by said lever into engagement with said ratchet teeth.

7. In a controller regulator, a base having a fulcrum and a bearing therein, a lever carried by said fulcrum, a plunger guided by said bearing, and a revoluble hood having cams adapted for tilting said lever and ratchet teeth adapted to be engaged by said plunger, said plunger being movable by said lever into engagement with said ratchet teeth.

8. In a controller regulator, a base having fulcrums and a bearing, a ring supported by said fulcrums, a plunger movable by said ring in said bearing, and a revoluble hood having means for operating said ring and means engaged by said plunger.

9. In a controller regulator, a base provided with bearing rings, a channel formed by said rings, diametrically disposed bearings and a median bearing in said channel, a ring having trunnions fulcrumed by said diametrically disposed bearings, a plunger adapted to reciprocate in said median bearing, and a hood having rings registering with the respective bearing rings of said base, cams adapted for tilting said fulcrumed ring, and ratchet teeth adapted to be engaged by said plunger.

10. In a controller regulator, a base member, a revoluble top member having a hub telescoped within said base member, said members having registering races, balls in said races whereby said members are locked together, a lever fulcrumed in one of said members, means carried by the other of said members whereby said lever is tilted, and means comprising ratchet teeth whereby the tilting of said lever checks the movement of said top.

11. In a controller regulator, a base having concentric bearing rings, a revoluble hood having a hub telescoped within said base, means whereby said hood and base are locked together, a lever fulcrumed in said base between said rings, and a plunger adapted to be operated by said lever, said hood having means for operating said lever and means engaged by said plunger.

12. In a controller regulator, a stationary member, a revoluble member, a plunger, a bearing fixed relatively to one of said members in which said plunger reciprocates, several sets of stopping devices fixed relatively to the other of said members with each of which devices said plunger is adapted to positively engage when said revoluble member is turned "on" and adapted to pass when said revoluble member is turned "off," and means operated by said revoluble member for moving said plunger into position for positively engaging each of said stopping devices.

13. In a controller regulator, a base, a hood revoluble therein, several sets of oppositely inclined ratchet teeth and several sets of cams fixed to one of said members, a fulcrum and a guide bearing fixed to the other of said members, a lever supported by said fulcrum, and a plunger adapted to reciprocate in said guide bearing, said cams operating said lever and said lever moving said plunger into position for positively engaging said ratchet teeth.

14. In a controller regulator, a base having a fulcrum and a guide bearing, a lever supported by said fulcrum, a plunger adapted to be moved in said guide bearing by said lever, and a revoluble hood having two sets of oppositely disposed ratchet teeth adapted to be engaged by said plunger and cams adapted for operating said lever.

In witness whereof I have hereunto set my name this 30th day of August, 1911, in the presence of the subscribing witnesses.

CYRUS P. EBERSOLE.

Witnesses:
J. V. E. TITUS,
WM. H. GRAVER.

Copies of this patent may be obtained for five cents each, by addressing the "Commissioner of Patents, Washington, D. C."